United States Patent Office 3,097,157
Patented July 9, 1963

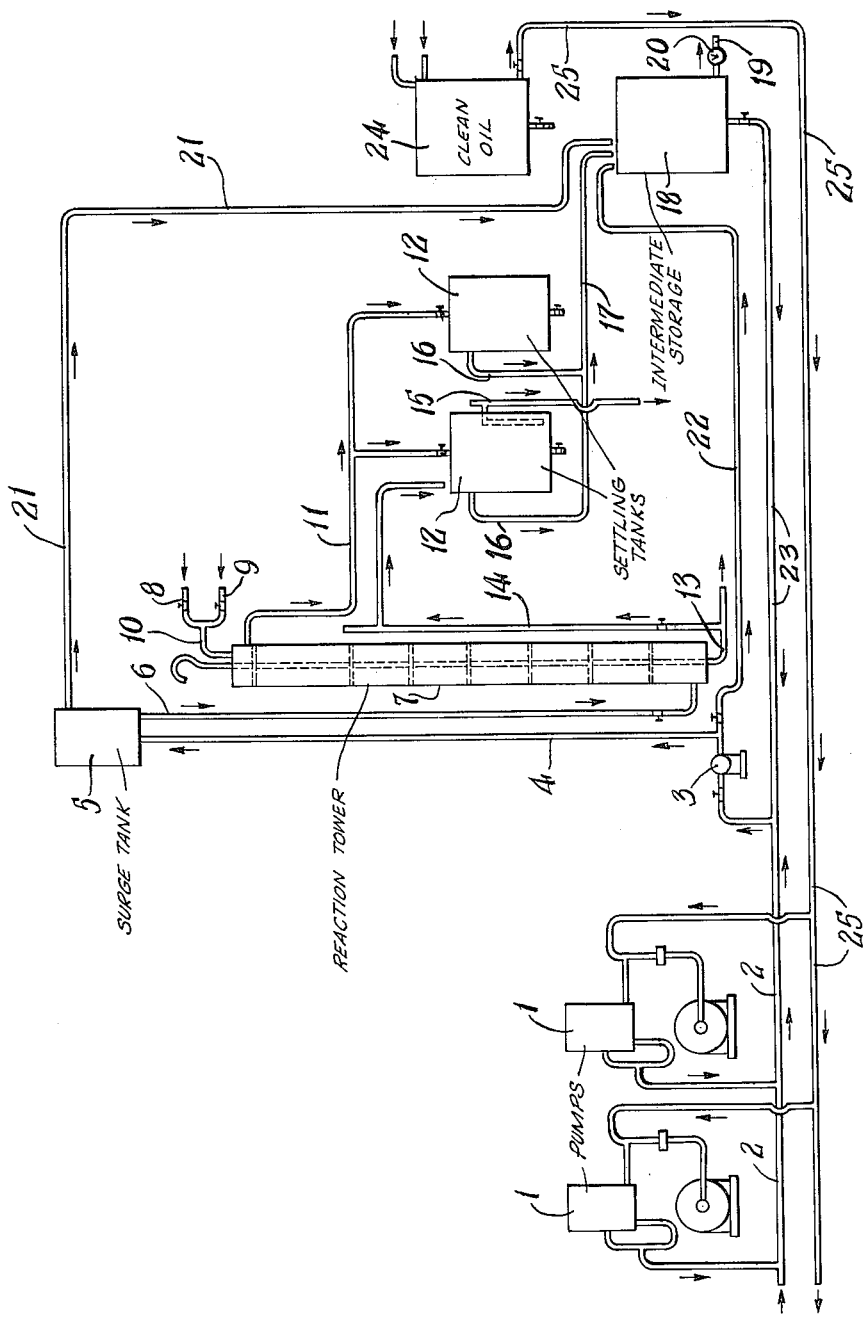

3,097,157
OIL PURIFICATION PROCESS
Oliver E. Accountius, Sierra Madre, Calif., assignor, by mesne assignments, to Chilean Nitrate Sales Corporation, New York, N.Y., a corporation of New York
Filed June 10, 1960, Ser. No. 35,161
2 Claims. (Cl. 208—182)

The present invention relates, in general, to improvements in the reclamation or decontamination of spent lubricating and sealant oils. More particularly, the invention contemplates the provision of a unique process for removing deleterious or corrosive materials from lubricating oils and the like which have become contaminated by reason of their use within processing systems that require repeated contact between the oils and contaminating reactants and/or reaction products handled within the systems. Specifically, the invention involves a process of the general class described which has unique application to the decontamination and reclamation of lubricating and sealant oils which are contaminated with iodine and hydriodic acid gas in substantial equilibrium therewith. For example, the process of the invention finds direct application in the purification of vacuum pump oils containing corrosive levels of iodine and/or hydriodic acid stemming from use of the oils within a system for the production of high-purity metals, such as titanium, zirconium and the like, which involves thermal dissociation of the corresponding metallic iodides under conditions of high-temperature and high-vacuum. The principles of the invention are further applicable to the removal of hydrogen iodide from petroleum fractions in general.

It has been found that in the production of titanium metal, for example, by thermal dissociation of a flowing body of titanium tetraiodide vapor, provision must be made within the attendant vacuum system to prevent the concentration of iodine and hydriodic acid which are unavoidably absorbed by the vacuum system oils from reaching levels at which they might impair the mechanical operability of the vacuum pumps, per se, due to their inherently corrosive properties. Heretofore, various mechanical means have been employed in an attempt to accomplish this result, but, for the most part, such arrangements have been found to be ineffective for the purpose intended.

The present invention is based upon my discovery that iodine and hydriodic acid contaminants introduced into such vacuum pump lubricating oils can be readily and effectively removed by a combined chemical reaction-solvent extraction technique in which the contaminated oil stream is contacted, in the liquid phase, within a suitable reaction zone, with a finely-divided metallic contact material capable of reacting with the iodine and hydriodic acid contaminants. The contact of the contaminated oil stream with the metallic contact material is effected in the presence of a suitable extraction solvent such as water, and is maintained for a period of time sufficient to convert substantially all of the contaminants to the metallic iodide corresponding to the metal of the contact material, which is extracted from the oil phase to the solvent phase with the production of a solvent phase rich in metallic iodide and a decontaminated oil phase substantially free of iodine and hydriodic acid. The purified oil is then recycled to the dissociation process or other system, preferably after suitably drying the oil in conventional manner.

The metallic contact materials which can be employed in the process of the invention include iron, aluminum and aluminum-magnesium scrap, among others. It is essential only that the contact material be capable of reacting with the contaminants in the oil to be reclaimed to form the metal salts of the contaminants. The metal salts of the contaminants should, in turn, be solvent-soluble so that they can be extracted into the solvent phase and thereby separated readily from the oil phase.

The temperatures preferred for contacting the spent lubricating oil with the metallic contact materials are not necessarily critical and, in general, conditions of temperature and contact time should be well below those which would cause thermal deterioration or alteration of the reclaimed oil. While removal of contaminants from spent oil can be effected at ordinary temperatures, it is generally preferred to employ elevated temperatures, particularly when the metallic contact materials are particularly spent. Effective removal of contaminants is readily accomplished at temperatures of about 180° F. to 200° F. while maintaining contact of the oil, water and contact material for a period of time sufficient to remove substantially all of the contaminants from the oil. In general, the higher the temperature the sorter the contact time while, conversely, the lower the temperature the longer the contact time required to accomplish the necessary purification.

As used herein and within the claims, the term "lubricating oils" may include any of the natural or synthetic oils. The naturally occurring oils can be derived from a paraffinic or naphthenic crude, whereas the synthetic lubricating oils can be of the diazelate ester type, silicone oils, etc., having a lubricating viscosity within the range from 50 SUS at 100° F. to 200 SUS at 210° F.

The flow rates of spent oil and water into the reaction zone are preferably maintained at such rates that substantially no emulsification of oil and water occurs. In general, the flow rates employed depend not only on temperature, but also upon the content of iodine, the pressure used, the desired extent of iodine removal, the particular metallic contact material employed and the age of the contact material in use. In general, however, it has been found a simpler expedient to eliminate flow rates as a dependent variable in the process by overdesign of the apparatus of the invention. That is to say, while flow rates of spent oil and water into the reaction zone are generally maintained so as to avoid substantial emulsification of oil and water, a sufficient amount of metallic contact material is present so that the down time of the apparatus is held to a minimum.

The period of time sufficient to remove the contaminants from spent lubricating oils will vary over a wide range and can be readily determined since it is essentially a function of the age of the metallic contact material in the process, the degree of fineness of said material, and the total quantity of contaminants removed from the oil. For example, it has been observed that under ideal conditions 55 gallons of highly contaminated oil can be cleaned in less than one hour. The reclamation process and the effectiveness thereof is mainly observed visually. The incoming contaminated oil is generally black and dirty whereas the reclaimed oil has a light yellow color.

The water employed in the decontamination process can be in the liquid phase or in the vapor phase. The use of steam, however, is not particularly preferred as it increases the possibility of emulsification of water and oil. The use of hot water is particularly preferred since its use increases the rate of chemical reaction at the surface of the metallic contact material and the mass transfer rates within the oil droplet and through the water. In addition, it is preferable to employ degassed water in the decontamination process to minimize any oxidative effect it might otherwise exert on the metallic contact material, thereby extending its useful life in the process.

The pressures used in the practice of this invention can have any reasonable value. Since the oil is treated after having been taken from the high pressure side of the vacuum pumps, there is no danger of contamination of the system by solvent. It should be noted in this connection that the process cannot be operated at a pressure below the vapor pressure of the solvent at the process temperature involved, i.e., in the case of water approximately 30 mm. Hg at room temperature, or somewhat higher pressures (above 500 mm. Hg) at 180–200° F.

It is believed that the invention may be best understood by reference to the following description of a specific embodiment thereof taken in conjunction with the accompanying drawing in which the single FIGURE illustrates a schematic flow diagram of a typical system incorporating the principles of the invention.

Referring now to the drawing wherein like numerals refer to like parts throughout; the spent or contaminated oil is delivered from the vacuum pumps 1 through line 2 to a transfer pump 3, and is thence delivered through line 4 to a surge tank 5 from whence it flows by gravity through line 6 to a reaction zone in tower 7. The bottom of tower 7 is packed with metallic contact material such as steel wool, scrap iron, finely-divided ferrous metal, aluminum, aluminum-magnesium scrap, or the like. Also charged to the reaction zone of tower 7 at the top thereof is water and steam from lines 8 and 9, respectively, which are mixed and introduced into said reaction zone through line 10.

In operation, the reaction zone of tower 7 is filled with a mixture of spent oil and hot water. Due to the difference in the densities of the spent oil and hot water, the spent oil passes through the tower counter-current to the hot water. The iodine and iodine-containing impurities in the spent oil react with the metallic contact material to form the metallic iodides corresponding to the metal of the contact material employed, which are simultaneously extracted from the oil by the hot water. Decontaminated oil and entrained water are removed at the top of the reaction zone of tower 7 and conducted through line 11 to the bottom of settling and washing tanks 12. The water phase containing metallic iodides is removed from the reaction zone through line 13 and is then discarded or treated in any desired manner, e.g., to recover the dissolved iodine. The treated oil is allowed to settle in settling tanks 12. A constant head of water is maintained in settling tanks 12 by providing the same with water from line 13 through line 14 and an overflow line 15. Treated oil is thereby continuously withdrawn through line 16 and introduced through line 17 into intermediate storage tank 18, whereupon residual moisture introduced in reaction zone 7 is removed by introducing the treated oil through line 19 to a suitable filtering system. Other means for removing the residual water from the reclaimed oil, including blowing warm air over a bed of the oil, can be employed.

Line 19 is provided with a shutoff valve 20 so that in the event that the surge tank 5 should become plugged the overflow of spent oil can be conducted through line 21 to the intermediate storage tank 18. Similarly, should the metallic contact material become depleted in the reaction zone of tower 7, spent oil can bypass the reaction zone through line 22 and be stored in intermediate storage tank 18. After any necessary repairs have been made, spent oil from intermediate storage tank 18 is simply recycled through line 23 to surge tank 5 via pump 3 and line 4 for further treatment in the reaction zone.

Oil delivered through 19, after removal of residual moisture, is conveniently stored in tank 24 prior to reintroduction into the system through line 25.

In a typical operation of the process of the invention contaminated oil was introduced at the bottom of a reaction zone packed with steel wool and maintained at atmospheric pressure at a rate of one gallon per minute. Hot water at a temperature of 190° F. was introduced at the top of the reaction zone at the rate of one gallon per minute. The level of contamination of the incoming oil feed stream had a maximum contamination of 11.0 grams of iodine or iodide per liter of oil and an average contamination of 3.0 grams per liter. The reclaimed oil withdrawn from the reaction zone had a contamination level of 0.0 grams of iodine or iodides per liter.

Having thus described the subject matter of my invention, what it is desired to secure by Letters Patent is:

1. The method of decontaminating spent lubricating oils contaminated with iodine and hydriodic acid that comprises maintaining a contaminated oil stream within a reaction zone and in direct contact with steel wool in the presence of water for a period of time sufficient to convert substantially all of the iodine and hydriodic acid to ferrous iodide and to extract from the oil by means of said water substantially all of said ferrous iodide, and separating a decontaminated oil from the aqueous solution containing said ferrous iodide.

2. The method of decontaminating spent lubricating oils contaminated with iodine and hydriodic acid that comprises maintaining a contaminated oil stream within a reaction zone and in direct contact with a solid, finely divided metal contact material capable of reacting with said contaminants and selected from the group consisting of iron, steel, aluminum and aluminum-magnesium alloys, said contacting being carried out in the presence of water and for a sufficient time to convert substantially all of the iodine and hydriodic acid to the metal iodide corresponding to the metal of said contact material, and to extract from the oil by means of said water substantially all of said metallic iodide, and separating a decontaminated oil from the aqueous solution containing said metallic iodide.

References Cited in the file of this patent
UNITED STATES PATENTS

| | | |
|---|---|---|
| 1,934,068 | Jolly et al. | Nov. 7, 1933 |
| 2,096,163 | Day | Oct. 19, 1937 |
| 2,459,409 | Bjornstjerna | Jan. 18, 1949 |
| 2,678,954 | O'Neil et al. | May 18, 1954 |
| 2,842,112 | Phillips et al. | July 8, 1958 |
| 2,895,852 | Loonam | July 21, 1959 |